United States Patent
Noda et al.

(10) Patent No.: US 6,395,370 B1
(45) Date of Patent: May 28, 2002

(54) CERAMIC STRUCTURE

(75) Inventors: Naomi Noda, Ichinomiya; Yoshinori Yamamoto, Nishikamo-gun; Takashi Harada, Nagoya, all of (JP)

(73) Assignee: NGK Insulators, Ltd. (JP)

( * ) Notice: Subject to any disclaimer, the term of this patent is extended or adjusted under 35 U.S.C. 154(b) by 0 days.

(21) Appl. No.: 09/936,521

(22) PCT Filed: Jan. 18, 2001

(86) PCT No.: PCT/JP01/00277
§ 371 (c)(1),
(2), (4) Date: Sep. 14, 2001

(87) PCT Pub. No.: WO01/53232
PCT Pub. Date: Jul. 26, 2001

(30) Foreign Application Priority Data

Jan. 24, 2000 (JP) ........................................ 2000-014834

(51) Int. Cl.$^7$ ................................................. B32B 3/12
(52) U.S. Cl. .................. 428/116; 428/212; 428/698; 428/701; 428/702; 428/158
(58) Field of Search ................ 428/212, 698, 428/701, 702, 116, 158

(56) References Cited

U.S. PATENT DOCUMENTS 6,214,227 B1 * 4/2001 Park et al. ................ 210/501.1

FOREIGN PATENT DOCUMENTS

| EP | 0 361 883 | 4/1990 |
|---|---|---|
| EP | 0 816 065 | 1/1998 |
| EP | 1 060 784 | 12/2000 |
| JP | 62-94307 | 4/1987 |
| JP | 4-130069 | 5/1992 |
| JP | 11-114338 | 4/1999 |

* cited by examiner

Primary Examiner—Deborah Jones
Assistant Examiner—A B Sperty
(74) Attorney, Agent, or Firm—Parkhurst & Wendel, L.L.P.

(57) ABSTRACT

A ceramic structure obtained by combining a plurality of sintered ceramic material segments (3a, 3b) having a thermal expansion coefficient of $3.0 \times 10^{-6}/°$ C. or more and integrating them, in which ceramic structure thermal impact-relieving zones (5a, 5b) capable of releasing the thermal impact applied are provided between the segments (3a, 3b) and the widths of the thermal impact-relieving zones (5a, 5b) in the sectional direction of the ceramic structure are various. This ceramic structure is capable of sufficiently release the thermal impact applied, without significantly reducing the effective sectional area of the structure or the overall strength of the structure, and can have the universality capable of coping with various applications and various materials.

11 Claims, 3 Drawing Sheets

STRUCTURE a

STRUCTURE b

STRUCTURE c

STRUCTURE d

STRUCTURE e

STRUCTURE f

STRUCTURE g

CERAMIC STRUCTURE

TECHNICAL FIELD

The present invention relates to a ceramic structure obtained by combining to integrate a plurality of sintered ceramic material segments.

BACKGROUND ART

When a ceramic structure of large thermal expansion is disposed and used in a site such as an exhaust gas passage that undergoes thermal impact, it is feared that cracks may be formed by the thermal impact. In order to solve this problem, there is disclosed in, for example, JP-A-8-28246, a technique of, as shown in FIG. 3, constituting a ceramic structure with a plurality of segments 3 and interposing an elastic sealing material or the like between the segments 3 to release the thermal impact received.

The thermal impact-relieving zones 5 formed by interposing the sealing agent or the like between the segments 3 are preferred to be as wide as possible in the sectional direction of the ceramic structure, from the standpoint of thermal impact relief. However, as the width W of the thermal impact-relieving zones is larger, the effective sectional area of the ceramic structure used for intended purpose is smaller correspondingly, resulting in reductions in the overall properties and efficiency of the structure and further in the overall strength of the structure. Meanwhile, when the width W of the thermal impact-relieving zones 5 is designed at a small level, the thermal impact received is difficult to release sufficiently and the thermal impact-relieving zones 5 themselves or the segments 3 are impaired.

The width W of the thermal impact-relieving zones is set preferably at an appropriate level so as to balance the above-mentioned parameters contradictory to each other. Balancing the two parameters actually, however, is difficult and the level of the thermal impact received differs depending upon the material of the segments 3, the material of the sealing agent or the like interposed between the thermal impact-relieving zones, and the application of the ceramic structure; therefore, there has been a problem that even if the width W of the thermal impact-relieving zones has been optimized, its practical applicability is very low.

The present invention has been completed in view of the above-mentioned situation, and aims at providing a ceramic structure which can release the received thermal impact sufficiently without significantly reducing the effective sectional area of the ceramic structure and the overall strength of the structure and which is abound in the universality in materials and applications as a ceramic structure.

DISCLOSURE OF THE INVENTION

According to the present invention, there is provided a ceramic structure obtained by combining a plurality of sintered ceramic material segments having a thermal expansion coefficient of $3.0 \times 10^{-6}/°$ C. or more and integrating them, characterized in that ceramic structure thermal impact-relieving zones capable of releasing the thermal impact applied are provided between the segments, and that the thermal impact-relieving zones in the sectional direction of the ceramic structure have the diversity in the width.

BEST MODE FOR CARRYING OUT THE INVENTION

Figure 3:
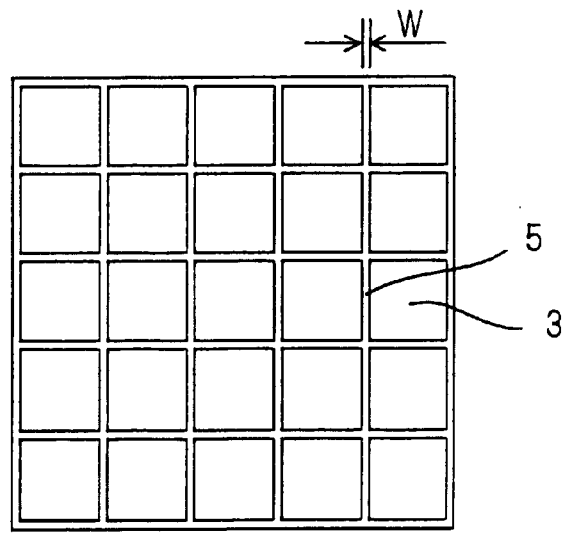
FIG. 3 is a sectional view showing a conventional ceramic structure constituted by a plurality of segments.

In the ceramic structure of the present invention, the width W of thermal impact-relieving zones 5 is not uniform as shown in FIG. 3 and is diversified in the sectional direction (the zones 5 have large and small widths); thereby, the thermal impact received can be released sufficiently without significantly impairing the effective sectional area of the sintered ceramic material segments and the overall strength of the ceramic structure.

Figure 1:
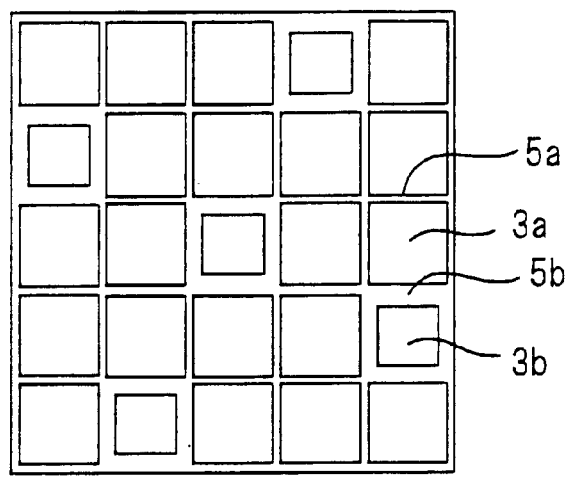
FIG. 1 is a sectional view showing an embodiment of the ceramic structure according to the present invention.

FIG. 1 is a sectional view showing an embodiment of the ceramic structure of the present invention, wherein sintered ceramic material segments 3a of large sectional dimension and sintered-ceramic material segments 3b of small sectional dimension are arranged at random and integrated. Owing to such constitution, thermal impact-relieving zones 5a of small width are formed between sintered ceramic material segments 3a and thermal impact-relieving zones 5b of large width are formed between sintered ceramic material segments 3a and 3b.

Figure 2:
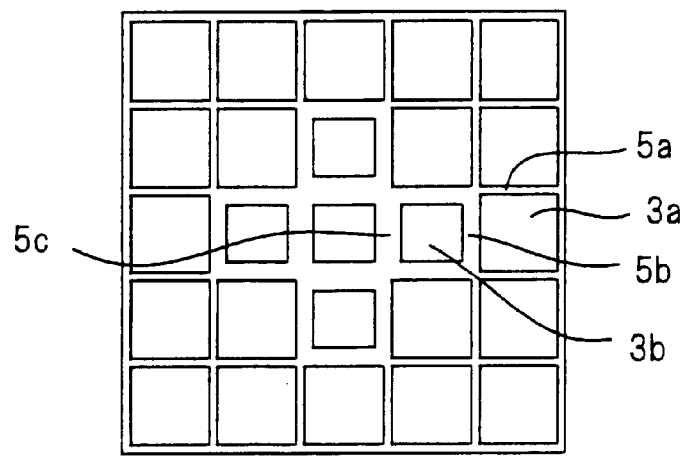
FIG. 2 is a sectional view showing other embodiment of the ceramic structure according to the present invention.

FIG. 2 is a sectional view showing other embodiment of the ceramic structure of the present invention, wherein sintered ceramic material segments 3b of small sectional dimension are converged at the sectional center of the ceramic structure and sintered ceramic material segments 3a of large sectional dimension are arranged so as to surround the segments 3b. As a result, between the sintered ceramic material segments 3a at the outermost part of the section are formed thermal impact-relieving zones 5a of smallest width; between the sintered ceramic material segments 3a and 3b present inside the above outermost segments 3a are formed thermal impact-relieving zones 5b of larger width; and between the sintered ceramic material segments 3b at the center of the section are formed thermal impact-relieving zones 5c of largest width.

When, in one section of a ceramic structure, there are located in the localized state thermal impact-relieving zones of large width and thermal impact-relieving zones of small width, the properties (e.g. strength) of the ceramic structure are non-uniform correspondingly; therefore, it is preferred that the zones of large width and the zones of small width are present in a somewhat mixed state, as shown in FIG. 1. Depending upon the application of the ceramic structure, one may adopt such a technique that the width of thermal impact-relieving zones be larger at a very site where thermal impact converges. For example, when a ceramic structure is laid out in the middle of a pipe and thermal impact converges at the center of the section of the structure, it is also preferred to form many thermal impact-relieving zones of large width at the sectional center and many thermal impact-relieving zones of small width at the outer part of the section, as shown in FIG. 2.

Such a ceramic structure of the present invention contains thermal impact-relieving zones having a plurality of widths and, therefore, has a high universality in the applicability and can appropriately deal with the distribution of thermal impact in the sectional direction, as compared with conventional ceramic structures wherein an optimum width of thermal impact-relieving zones is determined for the material used for sintered ceramic material segments, the material used for sealing agent or the like, interposed between thermal impact-relieving zones and the intended application of ceramic structure and wherein the thermal impact-relieving zones are uniformly combined (integrated) at that determined width. In the present ceramic structure, the diversity in the widths of thermal impact-relieving zones is specified in the sectional direction. When the present ceramic structure is used in an exhaust gas passage as, for example, a part for exhaust gas purification, as mentioned later, the distribution of thermal impact exists in the direction of gas flow as well; therefore, one may employ as a feature the diversity in the widths of thermal impact-relieving zones in the direction of gas flow, fundamentally based on the same reason for the case of the sectional direction.

The sintered ceramic material segments constituting the ceramic structure of the present invention has a thermal expansion coefficient of $3.0 \times 10^{-6}/°$ C. or more. The reason therefor is that large thermal impact such as to cause a damage (e.g. cracks) occurs hardly in a ceramic structure constituted by sintered ceramic material segments having a relatively small thermal expansion coefficient of less than $3.0 \times 10^{-6}/°$ C. The present ceramic structure is more effective when it is constituted by sintered ceramic materials segments having a thermal expansion coefficient of $4.0 \times 10^{-6}/°$ C. or more.

The sintered ceramic material segments preferably contain, as the main crystalline phase, one kind selected from the group consisting of mullite, alumina, silicon nitride and silicon carbide. Silicon carbide of high thermal conductivity is particularly preferred because it releases the received heat easily.

The thermal impact-relieving zones can be formed by filling the gaps between the segments with a sealing agent, a mat or the like, or by leaving the gaps as unfilled spaces. However, when the present ceramic structure is used as a part for exhaust gas purification (e.g. a carrier for catalyst) as mentioned later, the gaps between the segments are preferably filled with a sealing agent, a mat or the like for prevention of blow-through of exhaust gas and more preferably with a sealing agent capable of bonding the sintered ceramic material segments with each other because the resulting ceramic structure can further have a higher strength.

As the sealing agent, there are specifically preferred a ceramic fiber having heat resistance, a ceramic powder, a cement, etc. They can be used singly or in admixture of two or more kinds. As necessary, an organic binder, an inorganic binder or the like may also be used preferably because they can express the bonding action to improve bonding further.

In the present ceramic structure, in a certain section, the maximum width of thermal impact-relieving zones is preferably 2 times or more the minimum width of thermal impact-relieving zones. When the maximum width is less than 2 times the minimum width, it is impossible to obtain a sufficient effect, that is, release the received thermal impact sufficiently without significantly impairing the effective sectional area of ceramic structure or the overall strength of the structure. A maximum width of 3 times or more gives a higher effect and is more preferable.

The minimum width of thermal impact-relieving zones is preferably 0.1 mm or more, or 0.5% or more of the length of the longest side of segment section (the longer side when the segment section is rectangular). When the minimum width is smaller than that, the ceramic structure has a portion(s) too weak to the received impact [even when thermal impact-relieving zones of larger widths exist around such a portion(s)].

The maximum width of thermal impact-relieving zones is preferably 15.0 mm or less, or 50% or less of the length of the shortest side of segment section (the shorter side when the segment section is rectangular). When the maximum width is larger than that, (even when thermal impact-relieving zones of smaller widths exist around the maximum width), the effective sectional area of ceramic structure is significantly reduced and the overall strength of the structure is significantly decreased.

As representative applications of the ceramic structure of the present invention, there are mentioned parts for exhaust gas purification such as carrier for catalyst for exhaust gas purification, filter for capturing the particulates contained in diesel engine exhaust gas, i.e. diesel particulate filter (hereinafter referred to as DPF), and the like. In producing a ceramic structure of the present invention for use in such applications, there is used, as the sintered ceramic materials segments, a sintered porous ceramic material having a honeycomb structure, and a plurality of such segments are combined into an integral body to obtain a desired honeycomb structure. Here, "honeycomb structure" refers to a structure having a large number of through-holes (cells) divided by partition walls.

When the ceramic structure is a honeycomb structure used as a carrier for catalyst for exhaust gas purification or as a DPF, a distribution of thermal impact appears in the sectional direction. As the reasons therefor, the followings are mentioned.

(1) The speed of exhaust gas has, in general, a distribution in the sectional direction of the honeycomb structure. Therefore, the heat of exhaust gas generates a temperature distribution in the sectional direction of the honeycomb structure.

(2) When the honeycomb structure is used as a carrier for catalyst, the components of the exhaust gas entering the honeycomb structure give rise to various reactions including combustion, whereby the above-mentioned temperature distribution in the sectional direction is magnified.

(3) When the honeycomb structure is used as a DPF and the particulates deposited on the partition walls of the honeycomb structure are fired at a certain timing for reactivation of the DPF, the amount of the particulates deposited has a distribution correspondingly to the distribution of the speed of exhaust gas. The portion of larger particulate amount, of the honeycomb structure naturally generates a larger heat in the firing conducted for reactivation.

When the ceramic structure of the present invention is used as a carrier for catalyst for exhaust gas purification, it is possible that a catalyst component is loaded on individual porous sintered ceramic material segments of honeycomb structure and then the loaded individual segments are combined (in this case, the catalyst component is loaded only on the porous sintered ceramic material segments), or, it is possible that individual porous sintered ceramic material segments are combined and then a catalyst component is loaded on the combined segments (in this case, the catalyst component is loaded on the porous sintered ceramic materials segments and, when a filler is interposed between the segments for formation of thermal impact-relieving zones, on the filler as well).

When the ceramic structure of the present invention is used as a DPF, each of adjacent through-holes (cells) of sintered ceramic material segment is blocked alternately at one end opposite to each other so that the two end surfaces of each segment show a checkered pattern as a result of the above blocking.

When a diesel engine exhaust gas is passed through a ceramic structure having such segments from its one end, the exhaust gas enters the structure from the unblocked through-holes of the end, passes through the porous partition walls of each segment, and enters the through-holes blocked at the end but unblocked at other end. At the time of this passing through the partition walls, the particulates in the exhaust gas are captured by the partition walls and the particulates-removed exhaust gas after purification is discharged from the other end of the ceramic structure.

As the deposition of particulates on the partition walls proceeds, the partition walls give rise to plugging and reduce their function as a filter. Therefore, it is conducted to heat the ceramic structure periodically by means of heater or the like to fire and remove the deposited particulates and recover the filtering function of the partition walls. In order to promote the firing of the deposited particulates during recovery, the ceramic structure may have a catalyst component loaded thereon.

When the sintered ceramic material segments are a honeycomb structure, the cell density thereof is preferably 6 to 1,500 cells/in.$^2$ (0.9 to 233 cells/cm$^2$), more preferably 50 to 400 cells/in.$^2$ (7.8 to 62 cells/cm$^2$). When the cell density is less than 6 cells/in.$^2$ (0.9 cells/cm$^2$), the honeycomb structure is insufficient in strength and effective GSA (geometrical surface area); when the cell density is more than 1,500 cells/in.$^2$ (233 cells/cm$^2$), the honeycomb structure comes to have show an increased pressure loss when a gas passes through the structure.

When the sintered ceramic material segments have a honeycomb structure, the thickness of the partition walls is preferably 50 to 2,000 $\mu$m, more preferably 200 to 800 $\mu$m. When the thickness of the partition walls is less than 50 $\mu$m, the honeycomb structure is insufficient in strength; when the thickness of the partition walls is more than 2,000 $\mu$m, the honeycomb structure is low in effective GSA and the honeycomb structure comes to show an increased pressure loss when a gas passes through the structure.

The present invention is described in more detail below, referring to Examples. However, the present invention is in no way restricted to these Examples.

EXAMPLE 1

Figure 4A:
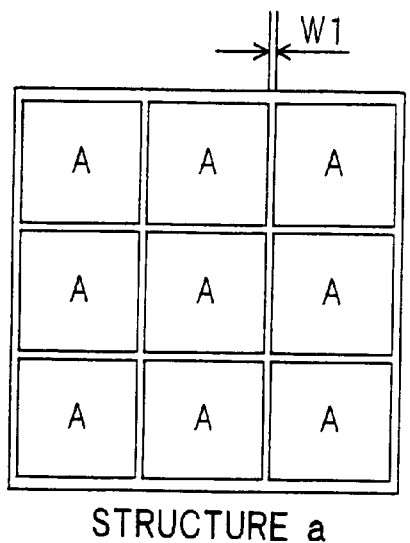
FIGS. 4(a) to 4(c) are sectional views showing the ceramic structures used in Example 1.
Figure 4B:
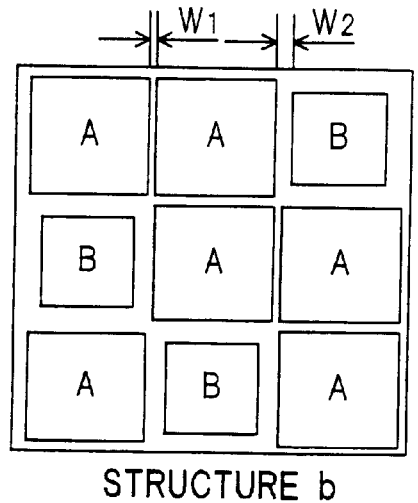
Figure 4C:
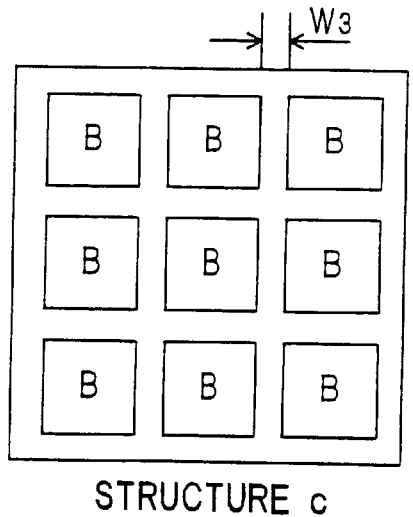
Figure 5A:
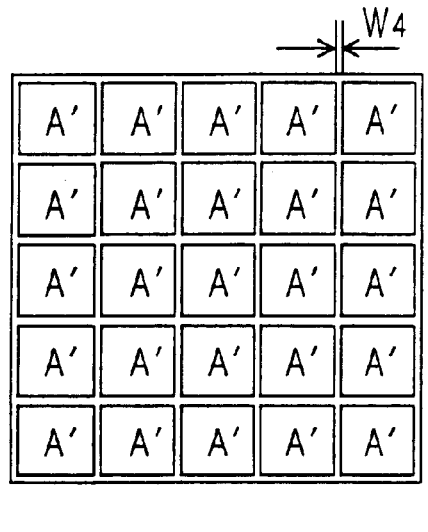
FIGS. 5(a) to 5(d) are sectional views showing the ceramic structures used in Example 2.
Figure 5B:
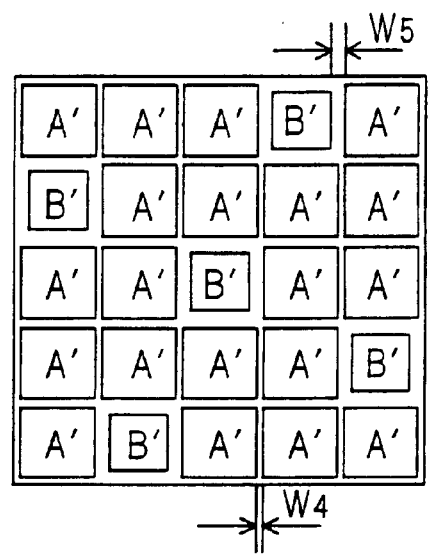
Figure 5C:
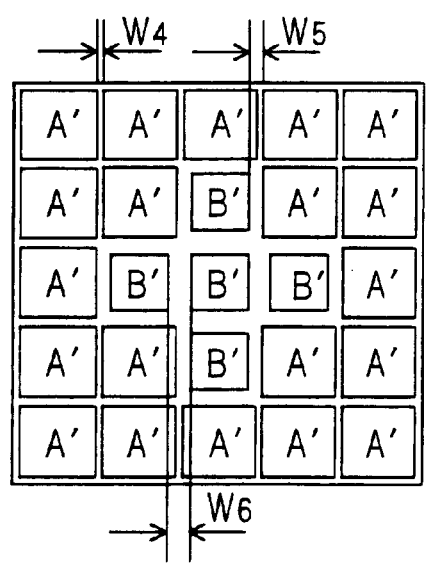
Figure 5D:
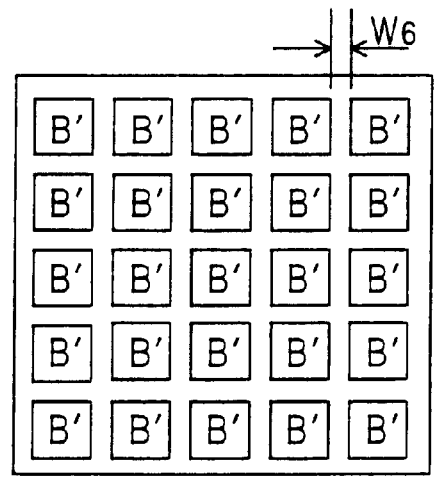

Two kinds of alumina-made honeycomb segments different in dimension [type A: 50 mm□×50 mm$^L$, type B: 48 mm□×50 cm$^L$] were combined by 3×3=9 segments as shown in FIGS. 4(a) to 4(c), and then integrated using a bonding agent to obtain structures a to c. In the figures, A and B show the types of honeycomb segments used.

As shown in the figures, the structure a was constituted by honeycomb segments of type A alone; the structure b was constituted by 6 honeycomb segments of type A and 3 honeycomb segments of type B; and the structure c was constituted by honeycomb segments of type B alone. In each structure, the width $W_1$ of each thermal impact-relieving zone formed between honeycomb segments of type A was 0.2 mm; the width $W_2$ of each thermal impact-relieving zone formed between honeycomb segment of type A and honeycomb segment of type B was 1.2 mm; and the width $W_3$ of each thermal impact-relieving zone formed between honeycomb segments of type B was 2.2 mm. The bonding agent was coated also on the sides of each structure in a thickness of 0.2 mm (1.2 mm in the case of the type B), whereby each structure was allowed to have an outer dimension of 150.8 mm□. Each one sample was cut out from the type A and type B honeycomb segments per se and measured for thermal expansion coefficient in gas flow direction, which was 8.0×10$^{-6}$/° C.

The structures a to c were subjected to a thermal impact resistance test. The test was conducted as follows. Each structure was inserted into an electric furnace heated at 700° C. or 900° C., kept therein for 30 minutes, then cooled quickly at room temperature; this operation (one cycle) was repeated 30 times (30 cycles); then, the resulting structure was visually observed for cracks. The results are shown in Table 1, together with the total effective sectional area of honeycomb portion of structure.

TABLE 1

| Structure | Total effective sectional area of honeycomb portion (cm$^2$) | Thermal impact resistance | |
|---|---|---|---|
| | | Room temp. <=> 700° C. | Room temp. <=> 700° C. |
| a | 225 | ○ | X* |
| b | 219 | ○ | ○ |
| c | 207 | ○ | ○ |

*Cracks appeared in the honeycomb and the bonding agent.

As shown in Table 1, the structure b according to an embodiment of the present invention was low in loss of effective sectional area of honeycomb portion and showed good thermal impact resistance.

EXAMPLE 2

Two kinds of silicon carbide-made honeycomb segments different in dimension (type A': 30 mm□×200 mm$^L$; type B': 26 mm□×200 mm$_L$; in each honeycomb segment, each of adjacent through-holes was blocked alternately at one end opposite to each other by using a sealing agent composed mainly of a silicon carbide powder, in such a manner that each end surface of the segments showed a checkered pattern.) were combined by 5×5=25 segments as shown in FIGS. 5(a) to 5(d), and then integrated using a bonding agent to obtain structures d to g. In the figures, A' and B' show the types of honeycomb segments used.

As shown in the figures, the structure d was constituted by honeycomb segments of type A' alone; the structure e was constituted by randomly arranging 20 honeycomb segments of type A' and 5 honeycomb segments of type B'; the structure f was constituted by arranging 5 honeycomb segments of type B' centrally and arranging 20 honeycomb segments of type A' so as to surround the honeycomb segments of type B'; and the structure g was constituted by honeycomb segments of type B' alone. In each structure, the width $W_4$ of each thermal impact-relieving zone formed between honeycomb segments of type A' was 0.3 mm; the width $W_5$ of each thermal impact-relieving zone formed between honeycomb segment of type A' and honeycomb segment of type B' was 2.3 mm; and the width $W_6$ of each thermal impact-relieving zone formed between segments of type B' was 4.3 mm. The bonding agent was coated also on the sides of each structure in a thickness of 0.3 mm (2.3 mm in the case of type B'), whereby each structure was allowed to have an outer dimension of 151.8 mm□. Each one sample was cut out from the type A' and type B' honeycomb segments per se and measured for thermal expansion coefficient in gas flow direction, which was 4.5×10$^{-6}$/° C.

Each of the above structures was encased into a can. The can covered the sides of each structure; its sectional shape was such that the portion covering the structure was square and the two ends were tubular (60 mm in diameter), that is, the square portion in the middle changed continuously to tubular front and back ends, whereby the can was fittable to a soot generator used in a thermal impact resistance test described later. Incidentally, the structure g was not subjected to the thermal impact resistance test because it fractured from the bonded portion at the time of accommodation in can.

Each of the structures d to f was subjected to a thermal impact resistance test. In the test, first, each of the structures d to f was fitted to a soot generator and soot (particulates) was deposited by 35 g inside the structure. Then, air preheated to 600° C. was introduced to fire the deposited soot. At this time, a thermocouple was fitted, for temperature measurement, to the cells (soot-deposited cells) which were in the center or its vicinity of each honeycomb segment and blocked at the back ends, at the cell position of 170 mm from the front end of structure (30 mm from the back end of structure); as a result, in any of the structures d to f, the central honeycomb segment showed the highest temperature increase and reached 1,400° C. After the test, the appearances of the structures d to f were observed; as a result, the structure d showed cracks in its bonded portion and honeycomb segment. The results are shown in Table 2.

TABLE 2

| Structure | Total effective sectional area of honeycomb portion ($cm^2$) | Thermal impact resistance | Strength |
|---|---|---|---|
| d | 225 | X*1 | ◯ |
| e | 214 | ◯ | ◯ |
| f | 214 | ◯ | ◯ |
| g | 169 | — | X*2 |

*1Cracks appeared in the honeycomb and the bonding agent.
*2Fractured at the time of encasing into can.

As shown in Table 2, the structures e and f (which were embodiments of the present invention) were low in loss of effective sectional area of honeycomb portion, maintained a strength resistant to encasing in the can, and showed good thermal impact resistance.

INDUSTRIAL APPLICABILITY

As stated above, the ceramic structure of the present invention can release the received thermal impact sufficiently without significantly reducing the effective sectional area of structure or the overall structure of structure, and can have the universality capable of coping with various applications and various materials.

What is claimed is:

1. A ceramic structure obtained by combining a plurality of sintered ceramic material segments having a thermal expansion coefficient of $3.0 \times 10^{-6}/°$ C. or more and integrating them, in which ceramic structure thermal impact-relieving zones capable of releasing the thermal impact applied are provided between the segments and the widths of the thermal impact-relieving zones in the sectional direction of the ceramic structure are various.

2. A ceramic structure according to claim 1, wherein the thermal expansion coefficient of the sintered ceramic material segments is $4.0 \times 10^{-6}/°$ C. or more.

3. A ceramic structure according to claim 1, wherein the sintered ceramic material segments contain, as the main crystalline phase, one kind selected from the group consisting of mullite, alumina, silicon nitride and silicon carbide.

4. A ceramic structure according to claim 1, wherein the thermal impact-relieving zones are formed by filling a sealing agent capable of bonding the sintered ceramic material segments with each other, between the sintered ceramic material segments.

5. A ceramic structure according to claim 1, wherein in a certain section of the ceramic structure, the maximum width of the thermal impact-relieving zones is at least two times the minimum width of the thermal impact-relieving zones.

6. A ceramic structure according to claim 1, wherein the widths of the thermal impact relieving-zones are in a range of 0.1 to 15.0 mm.

7. A ceramic structure according to claim 1, wherein the sintered ceramic material segments are made of a porous sintered ceramic material having a honeycomb structure.

8. A ceramic structure according to claim 7, which is used as a part for exhaust gas purification.

9. A ceramic structure according to claim 7, which is used as a carrier for catalyst for exhaust gas purification.

10. A ceramic structure according to claim 7, which is used as a filter for capturing the particulates contained in an exhaust gas of diesel engine.

11. A ceramic structure according to claim 10, which has a catalyst component loaded thereon.

* * * * *